March 24, 1953 W. P. HUNSDORF 2,632,603

METHOD AND APPARATUS FOR COIL WINDING

Filed March 25, 1947 14 Sheets-Sheet 1

INVENTOR.
William P. Hunsdorf,
BY
William J. Wesseler,
ATTORNEY.

March 24, 1953 W. P. HUNSDORF 2,632,603

METHOD AND APPARATUS FOR COIL WINDING

Filed March 25, 1947 14 Sheets-Sheet 2

INVENTOR.
William P. Hunsdorf,
BY
William J. Wesseler,
ATTORNEY.

March 24, 1953 W. P. HUNSDORF 2,632,603

METHOD AND APPARATUS FOR COIL WINDING

Filed March 25, 1947 14 Sheets-Sheet 3

William P. Hunsdorf,
INVENTOR.

BY William J. Wesseler,
ATTORNEY.

March 24, 1953 W. P. HUNSDORF 2,632,603

METHOD AND APPARATUS FOR COIL WINDING

Filed March 25, 1947 14 Sheets-Sheet 4

INVENTOR.
William P. Hunsdorf,
BY
William J. Euesseler,
ATTORNEY.

INVENTOR.
William P. Hunsdorf,
BY
William J. Wessler,
ATTORNEY.

March 24, 1953 W. P. HUNSDORF 2,632,603

METHOD AND APPARATUS FOR COIL WINDING

Filed March 25, 1947 14 Sheets-Sheet 6

INVENTOR.

BY William P. Hunsdorf

William J. Wessler

ATTORNEY.

March 24, 1953 W. P. HUNSDORF 2,632,603

METHOD AND APPARATUS FOR COIL WINDING

Filed March 25, 1947 14 Sheets-Sheet 7

INVENTOR.
William P. Hunsdorf,
BY
William J. Wesseler,
ATTORNEY.

William P. Hunsdorf,
INVENTOR.

BY William J. Wesseler,
ATTORNEY.

March 24, 1953 W. P. HUNSDORF 2,632,603

METHOD AND APPARATUS FOR COIL WINDING

Filed March 25, 1947 14 Sheets-Sheet 9

INVENTOR.
William P. Hunsdorf,

BY

William J. Aesseler,
ATTORNEY.

METHOD AND APPARATUS FOR COIL WINDING

Filed March 25, 1947 14 Sheets-Sheet 10

INVENTOR.
William P. Hunsdorf
BY
William J. Wesseler,
ATTORNEY.

INVENTOR.
William P. Hunsdorf,
BY
William J. Wesseler,
ATTORNEY.

METHOD AND APPARATUS FOR COIL WINDING

Filed March 25, 1947 14 Sheets-Sheet 12

INVENTOR.
William P. Hunsdorf
BY
William J. Wesseler,
ATTORNEY.

METHOD AND APPARATUS FOR COIL WINDING

Filed March 25, 1947

INVENTOR.
William P. Hunsdorf,
BY
William J. Wesseler,
ATTORNEY.

INVENTOR.
William P. Hunsdorf
BY
William J. Wesseler,
ATTORNEY.

Patented Mar. 24, 1953

2,632,603

UNITED STATES PATENT OFFICE 2,632,603

METHOD AND APPARATUS FOR COIL WINDING

William P. Hunsdorf, Cleveland, Ohio, assignor, by mesne assignments, to Cleveland Electrical Equipment Co. Inc., Cleveland, Ohio, a corporation of Ohio Application March 25, 1947, Serial No. 737,006

11 Claims. (Cl. 242—13)

The present invention relates generally as indicated to a method and apparatus for coil winding, and more particularly to the balanced winding of coils for armatures and fields of electric apparatus on a high-speed quantity production basis.

One general object of this invention is to provide an apparatus which is capable of handling a plurality of wires and of simultaneously placing the wires in a symmetrical balanced coiled relation in the slots of an armature core or the line in firmly nested relation whereby adequate ventilation will be provided for the wires at the ends of the armature core without reducing the firmness of the construction to resist "breathing" movement due to the effect of centrifugal force.

Another object of this invention is to provide an apparatus which includes means for receiving and firmly holding an armature core and for moving the same through a predetermined path of motion during the winding operation and thereafter discharging the armature in wound condition preliminary to a similar series of operations on a similar core unit inserted in lapped relation to the wires strung on the apparatus during a pause in the continuous operation of the apparatus.

Another object is to provide an apparatus which includes mechanism for controlling the positions of wire feeding members with reference to the path of movement of the armature core so that adequate force and controlled tension may be utilized in high-speed operations with a high degree of precision.

Another object of this invention is to provide a method of applying a series of wires simultaneously around predetermined slots in balanced relation to an armature core at high speed and with exact precision of movement during the winding operation.

Another object of the invention is to provide an apparatus adapted to handle multiple wires or series of wires simultaneously and place them on the core member of a unit of electrical apparatus in a predetermined relationship in the slots thereof, and under a predetermined degree of tension and with a restricted projection or build-up of the end portions of the coils.

Another object of the invention is to provide means of feeding wire to an armature core from reels supporting such wire supply in a manner to prevent twisting of the wires and to insure the seating of the wires in compact coils firmly held against displacement through high-speed centrifugal forces.

Another object of the invention is to provide an apparatus, particularly adapted for winding armatures or other units of electrical apparatus in a minimum of time and without injury to the insulated coatings upon the wire, and without waste of material.

Another object of the invention is to provide an apparatus to wind one or more wires upon the core of an armature and distribute such wires in a manner to reduce the terminal projections of the coils without losing the electrical efficiency of the wound part.

Another object of the invention is to provide apparatus for winding coils upon electrical devices, wherein the longitudinal movement of the armature core relative to the wire feeding members may follow an oblique path of movement which merges with the transverse or axial rotation of the armature core at the end of each stage of its oblique longitudinal movement, and includes a means for adjusting such mechanism to conform exactly with the angularity of the slots of the armature core.

Another object of the invention is to provide a control mechanism for a winding apparatus which will provide for the winding of a predetermined number of turns of wire, preliminary to controlling the positioning of the terminal portions of each coil.

Other objects and advantages of the invention will become apparent as the following description proceeds.

To the accomplishment of the foregoing and related ends, said invention then comprises the features hereinafter fully described and particularly pointed out in the claims, the following description and the annexed drawings setting forth in detail one illustrative embodiment of the invention, this being indicative, however, of but one of the various ways in which the principle of the invention may be employed.

In said annexed drawings:

Fig. 2A is a sectional elevation as seen along the line 2A—2A, shown in Fig. 2;

Figure 1:
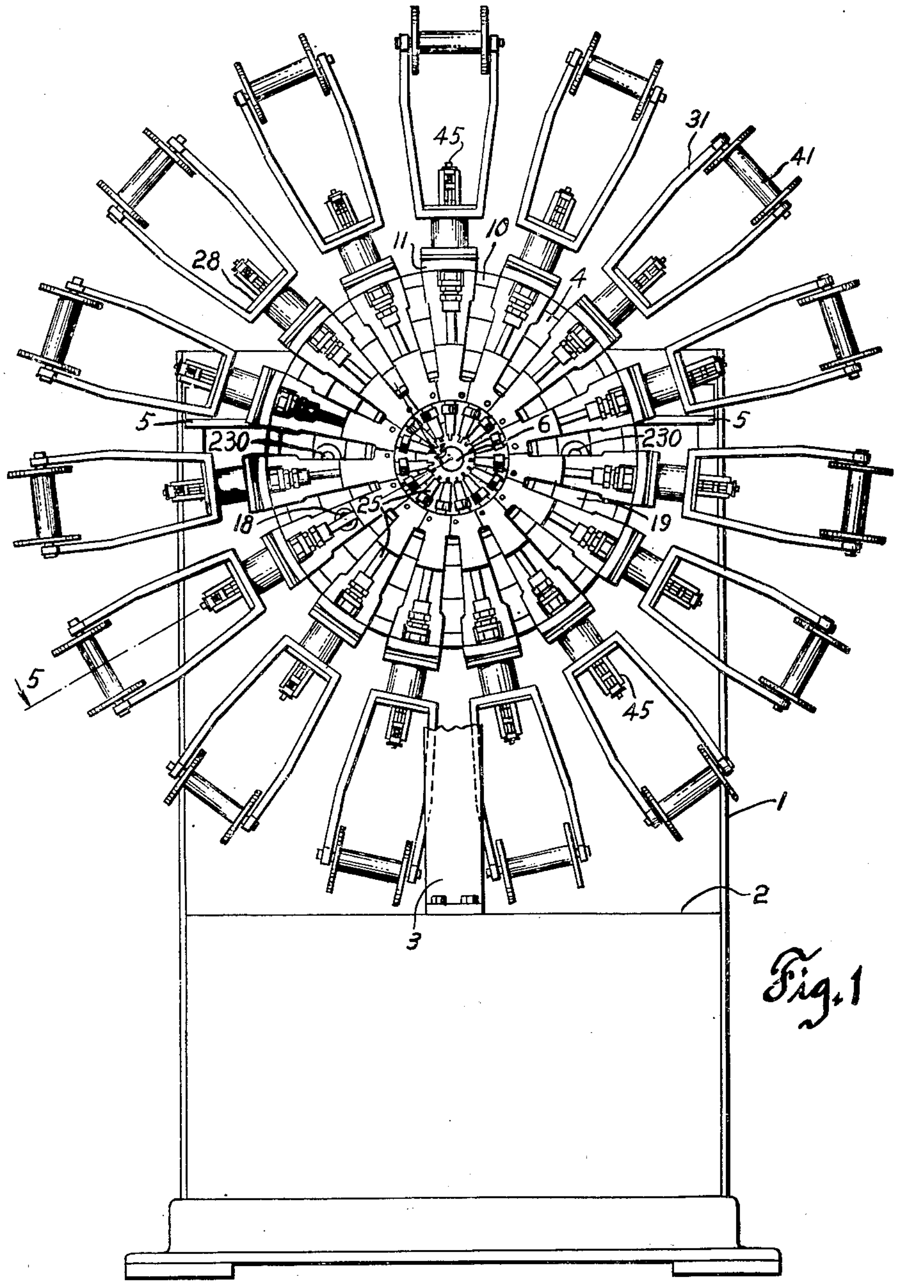
Fig. 1 is a front elevation of an apparatus embodying the principle of my invention and showing the details of the wire-feeding head.
Figure 2:
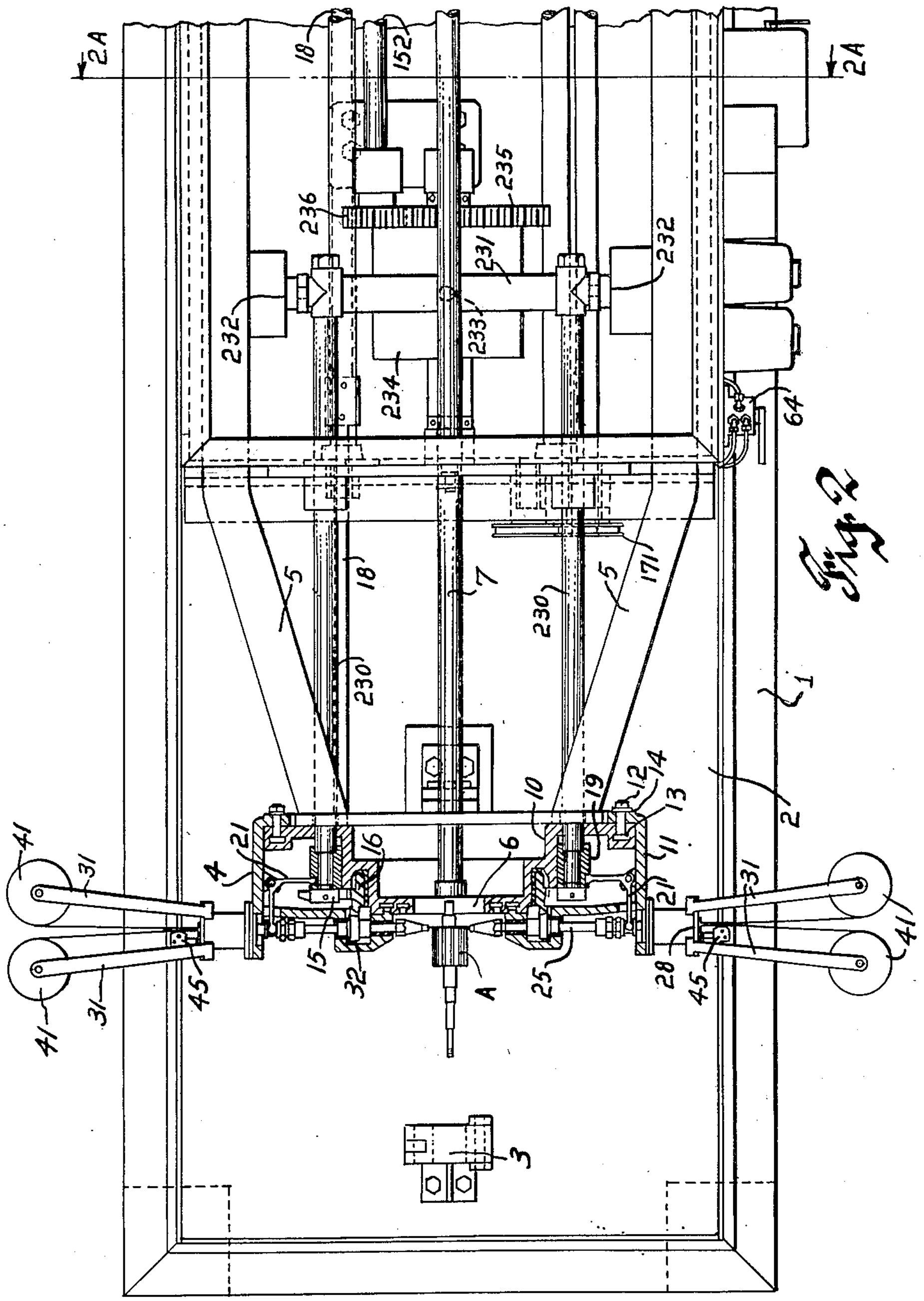
Fig. 2 is a top plan view of the forward portion of the apparatus.
Figure 12:
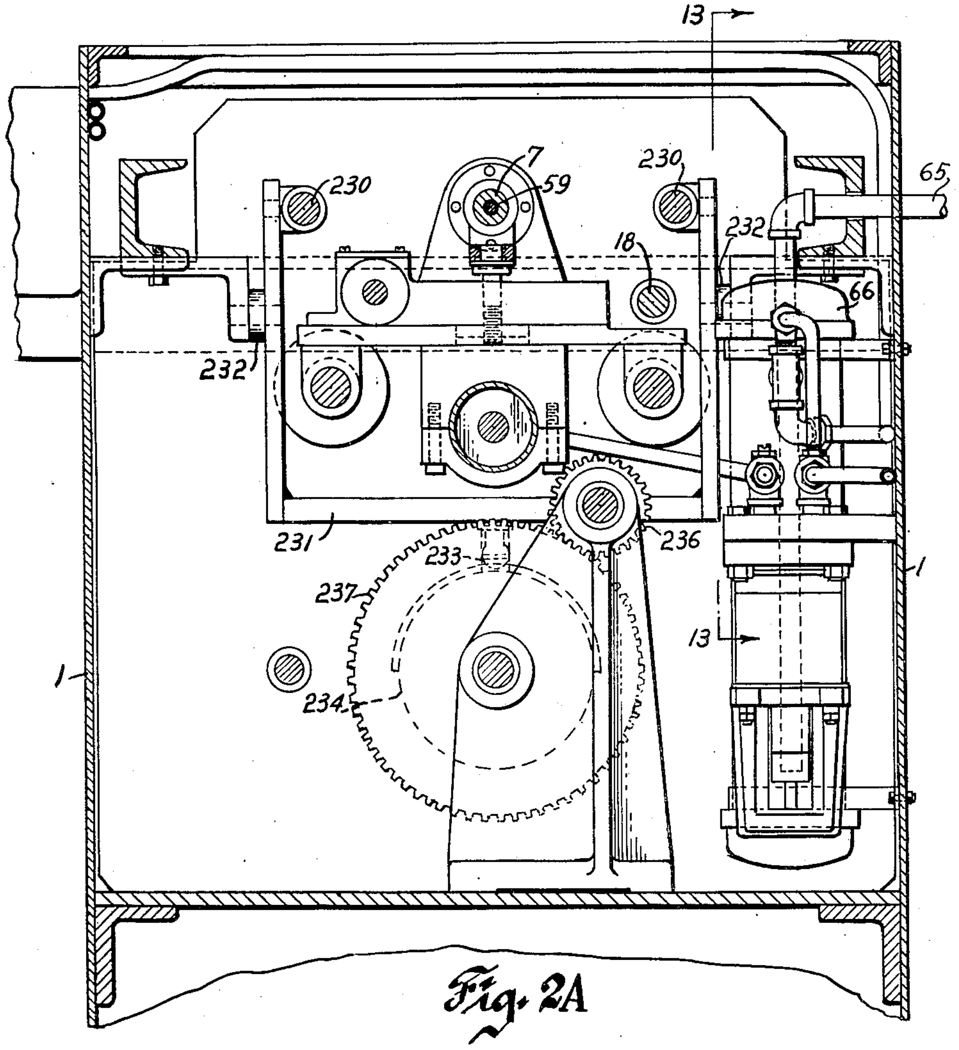
Fig. 12 is a view of the mechanism shown in Fig. 10, as seen along the line 12—12, looking in the direction of the arrow.
Figure 12:
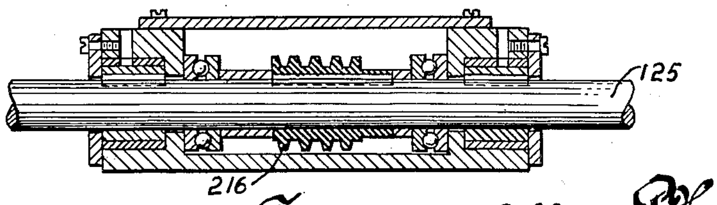
Figure 3:
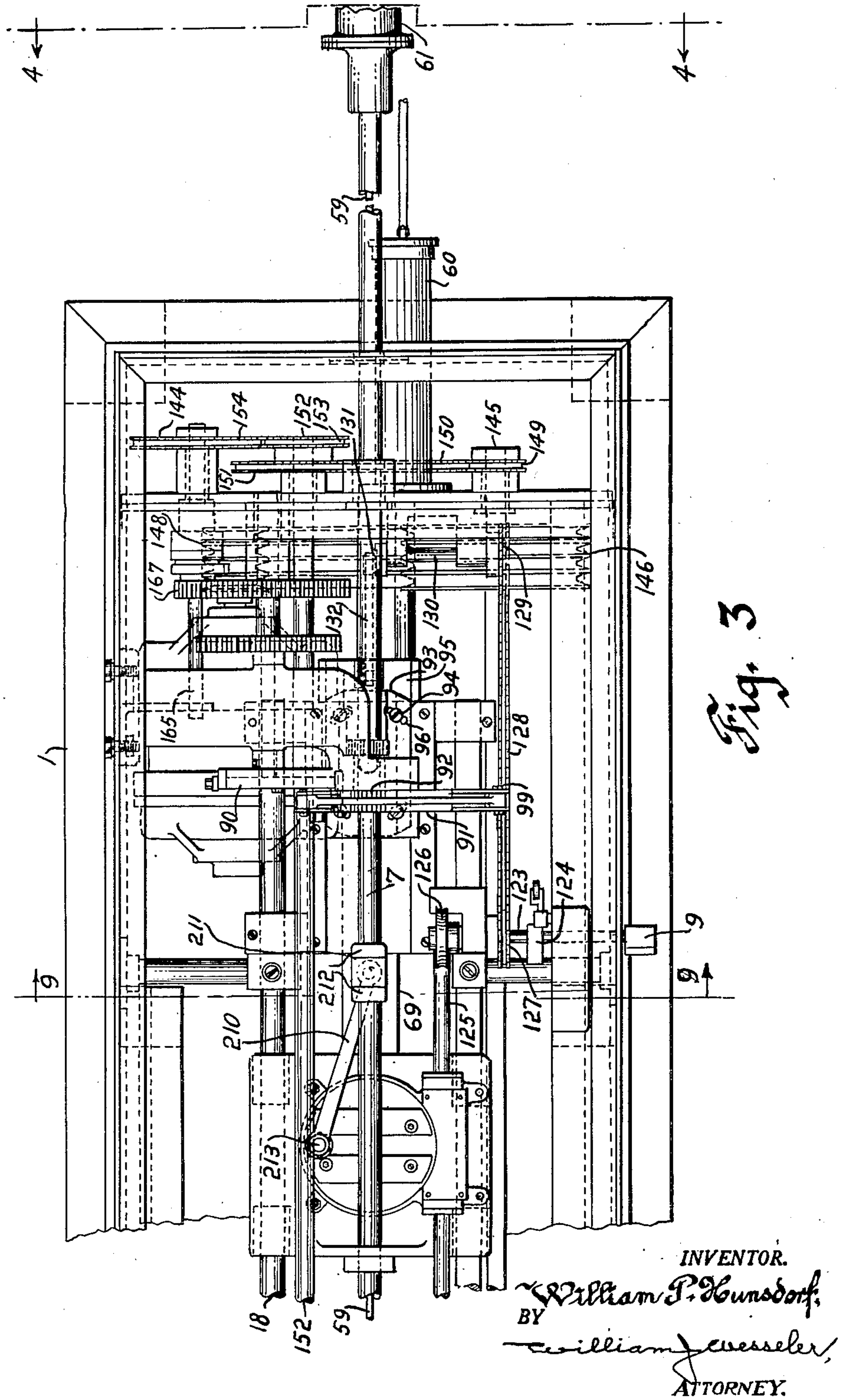
Fig. 3 is a top plan view of the rearward portion of the apparatus, continuous with that shown in Fig. 2.

Referring now more especially to the drawings and first to Figs. 1, 2 and 3, the apparatus comprises a housing 1 of rectangular shape with an extension platform 2 at its forward end to support the loading and unloading unit 3. At the front of said housing 1, a wire feeding head or winding head 4 is positioned on a horizontal support 5, said head 4 being provided with a central opening or winding throat 6 within which an armature core A is adapted to be reciprocated and rotated, said armature core A being carried on the armature supporting shaft 7 which is adapted to be reciprocated and rotated as aforesaid.

The driving mechanism of the apparatus is herein shown (see Fig. 18) as comprising an electric drive motor 8 contained within housing 1 and automatically controlled by a counting device 9.

*Wire feeding head*

Figure 5:
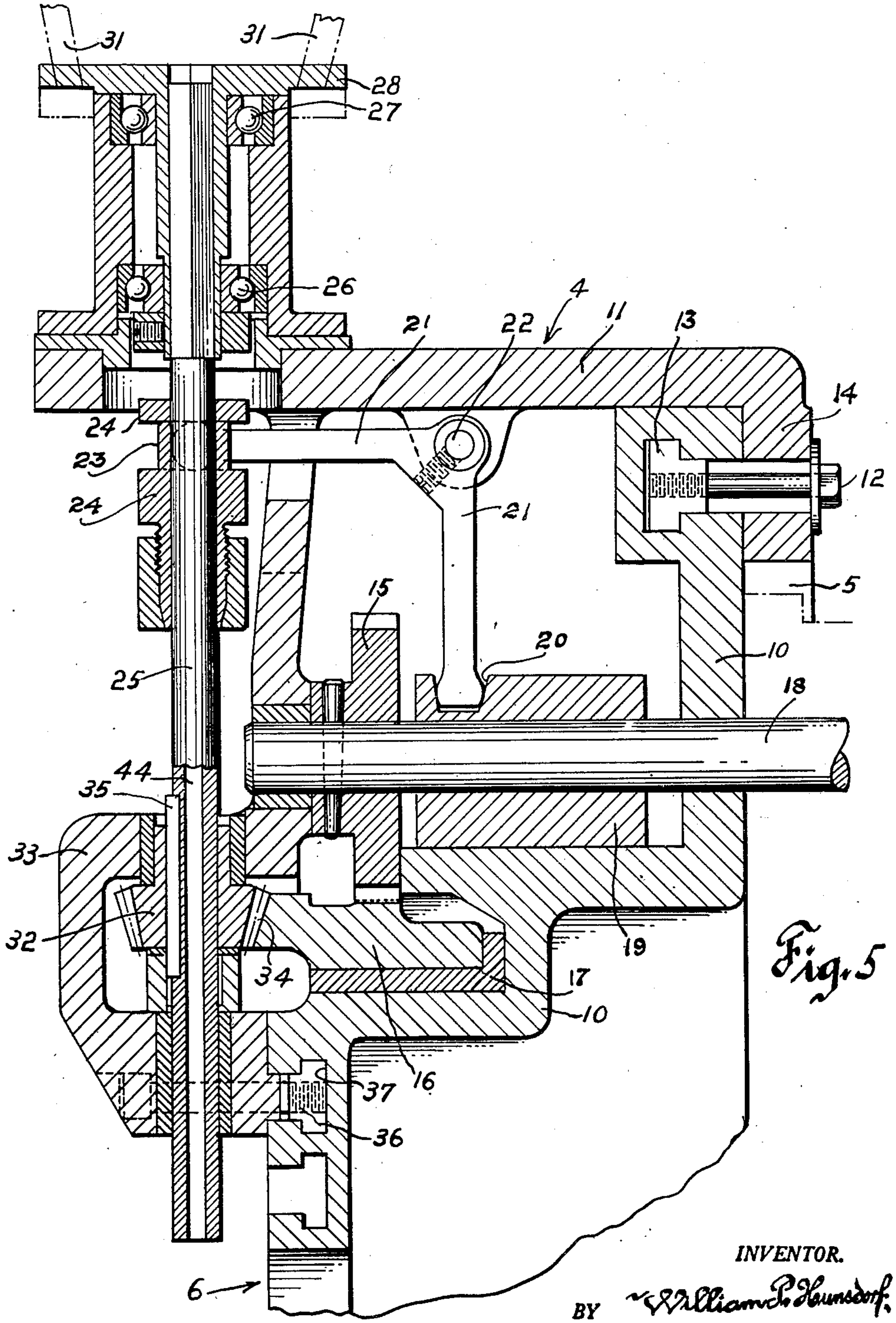
Fig. 5 is an enlarged fragmentary detail view of the mechanism for rotating and radially adjusting the individual tubular wire feeds, as seen along line 5—5 in Fig. 1, looking in the direction of the arrows.

(Figs. 1, 2 and 5)

As best shown in Figs. 1, 2, and 5, the wire feeding head 4 comprises a circular disc-like member 10 carrying individual feeding units 11 of generally segmental form equal in number to the number of slots in the armature core A or a different number of slots for fractional winding. Said feeding units 11 are held in position on said disc 10 by means of headed bolts 12 which have their heads engaged in an annular recess 13 formed around the periphery of the supporting disc 10. As is shown more particularly in Fig. 5 of the drawings, each unit 11 is preferably in the form of a segmental plate held in the periphery of said disc 10 by means of the bolts 12 just referred to, engaged through an inwardly turned flange 14 on each unit through the use of the slotted engagement of the units with said disc. Any predetermined number of wire feeding units 11 may be located on said disc in accordance with the number of slots in the armature core which the apparatus is adapted to wind and the outer face of said disc 10 is preferably calibrated to facilitate accurate positioning of said feed units 11.

One of the segmental units 11 is retained in fixed position on said disc 10 in order to provide the means for rotating the tubular feeding members within the units 11 in unison at intervals in predetermined directions as will be presently explained. The segmental unit 11 illustrated in Fig. 5 supports the spur gear 15 which supplies the driving force to all of the other units 11 by reason of the engagement of said spur gear 15 with the toothed annular shell 16 which extends completely around the disc 10 and rides on the bearing 17. The spur gear 15 is mounted on a drive shaft 18 which extends rearwardly through the disc 10. A sliding cam ring 19 is provided on the disc 10, said cam ring serving to actuate individual bell crank adjusting levers 21 supported on pivots 22 on said segmental wire feeding units 11 and having their forward ends engaged in an annular recess 23 between shoulders 24 secured on tubular wire feeding members 25 which are supported at their upper ends in spaced bearings 26—27 in a rotatable support 28, to the under surface of which the reel-holding brackets 31 are firmly secured. The lower ends of the tubular wire feeding members 25 are provided with bevel gears 32 in running engagement with the bevel gear 34 of the annular shell 16. The bevel gears 32 are held in sliding engagement with the tubular wire feeding members 25 by means of a key 35 which provides for the radial movement of each of the tubular wire feeding members 25 toward and away from the winding throat 6. The lower portions 33 of said segmental member 11 are adapted to be locked to the supporting disc 10 as by means of the headed bolts 36 engaged in annular slots 37 extending around the supporting disc 10.

Any number of reels may be supported on the winding head 4 or adjacent thereto and for many purposes it has been found desirable to supply from one to four wires through each unit 11, such serving to provide a very compact pattern about the armature core A which is wound with this apparatus. When numerous reels are required, they may be closely spaced and the above described swiveling mechanism may be omitted, the construction of the multiple feeds thus being very compact and simple in construction.

Figure 6:
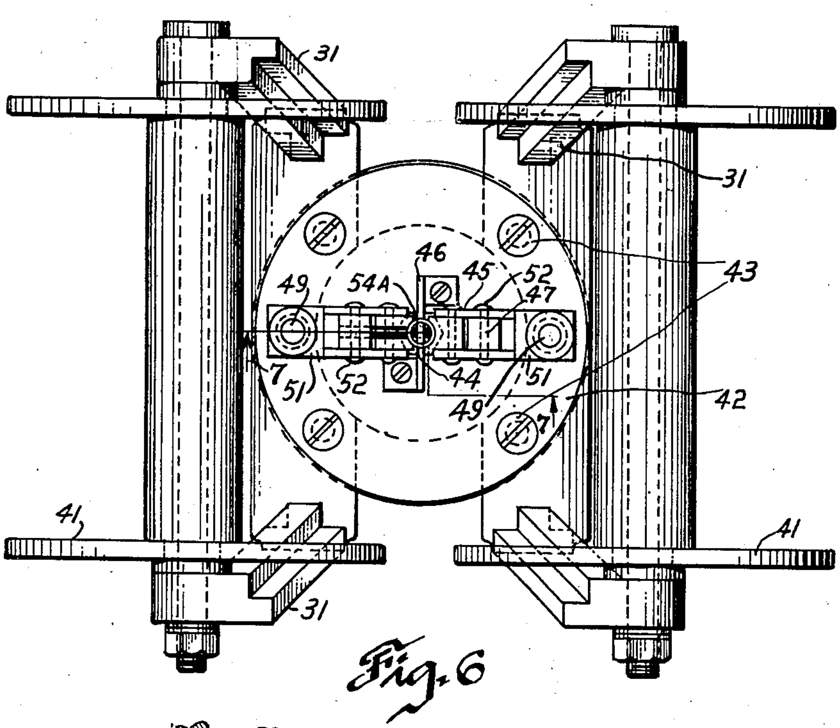
Fig. 6 is a fragmentary plan view showing the wire supply reels and the tensioning device.
Figure 7:
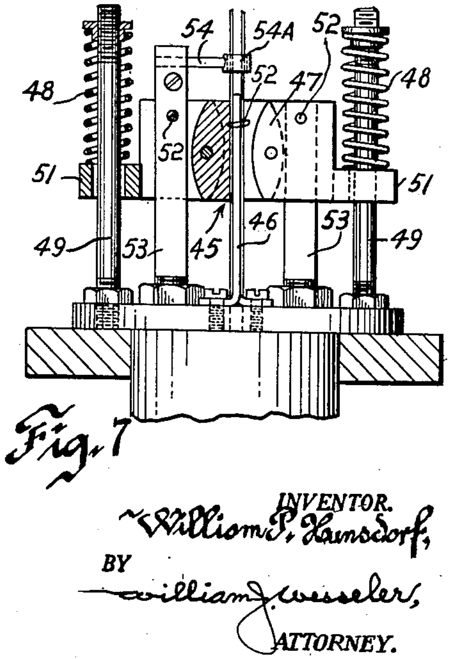
Fig. 7 is a fragmentary sectional elevation taken along the line 7—7 shown in Fig. 6, illustrating details of the tensioning device.

Figs. 1, 2 and 6 clearly show the brackets 31 supporting a pair of reels 41 upon the rotatable support 28 by means of suitable fastening members 43. The wires from the reels 41 are guided to the central opening 44, Fig. 6 of the tubular wire feeding members 25 by means of a wire tensioning device 45, the construction of which is most clearly shown in Figs. 6 and 7.

Said tensioning device 45 comprises a metal plate 46 against which a fiber block 47 is adapted to be rocked by means of a coil spring 48 supported on an adjustable guide rod 49 and bearing against a projecting shoulder on the carrier 51 for said block. Said fiber block 47 is pivotally connected to the carrier 51 and in turn the carrier is engaged upon a pivot pin 52 supported on a standard 53. The upper end of said standard 53 supports an arm 54 carrying a suitable guide eye 54A for the wire being fed through the tubular wire feeding members 25. There are two such fiber blocks 47 and carriers 51 therefor disposed on opposite sides of each plate 46 whereby the wires being fed from the reels 41 will be frictionally engaged between said fiber blocks 47 and said plate 46.

The assembly of the reels 41, the tensioning device 45 and the tubular wire feeding members 25 are rotated about the axes of the feeding members 25 by means of the bevel gears 32 meshing with the bevel gear 34 on the geared annular shell 16, at the end of the longitudinal strokes of the armature supporting shaft 7, such rotation always being in a predetermined direction to prevent twisting of the wires as would occur if said assembly were not thus rotatably supported as aforesaid to follow the travel of the wire feeding members 25 adjacent to the ends of the slots of the armature A.

Drive shaft 18 is intermittently operated by engagement of a roll clutch as hereinafter described which effects rollover movement of the armature-supporting shaft 7.

*Armature positioning and moving mechanism*

Figure 10:
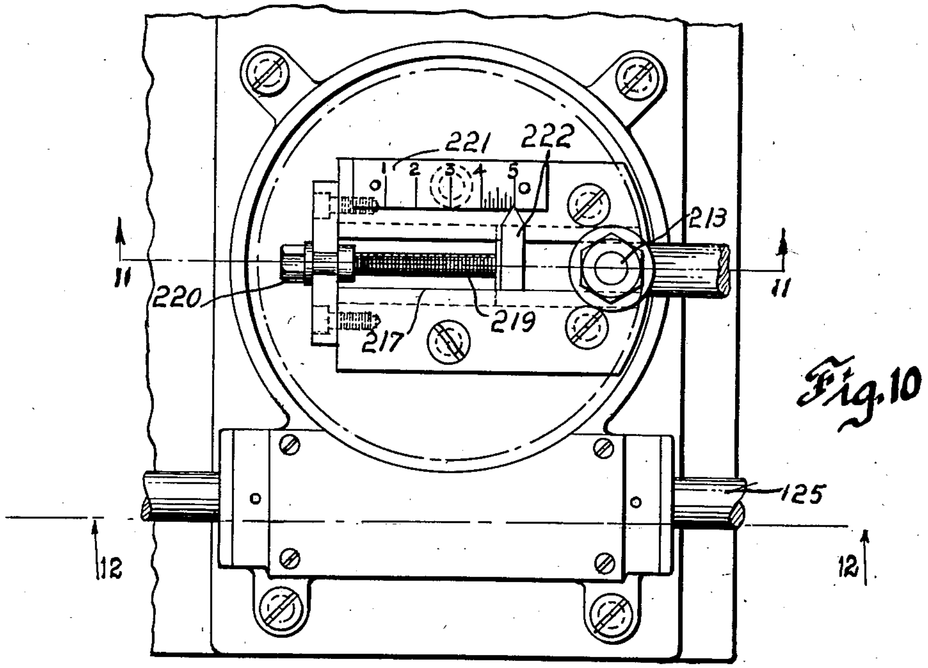
Fig. 10 is a plan view of the mechanism for operating the armature supporting shaft and adjusting the length of the stroke thereof.
Figure 11:
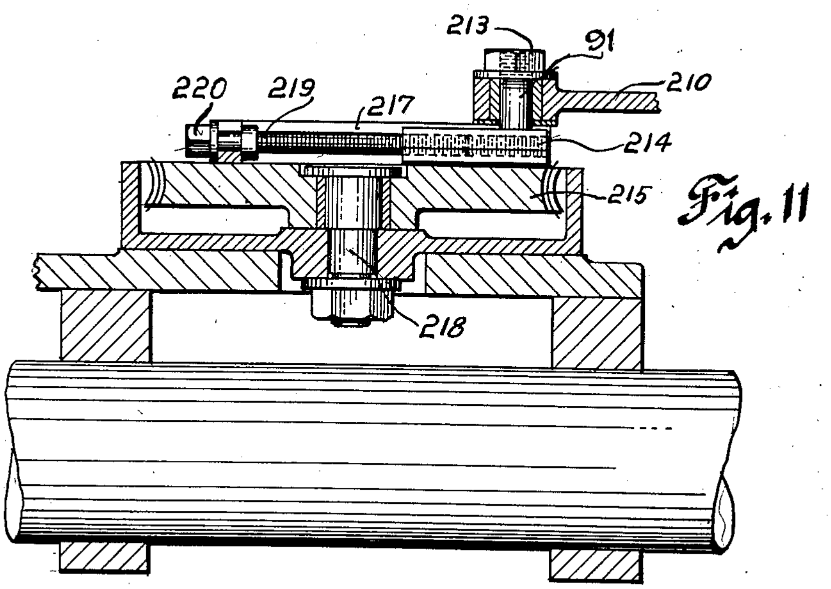
Fig. 11 is an enlarged sectional detail view of the worm drive as seen along the line 11—11, in Fig. 10, looking in the direction of the arrows.

(Figs. 10, 11)

Figure 4:
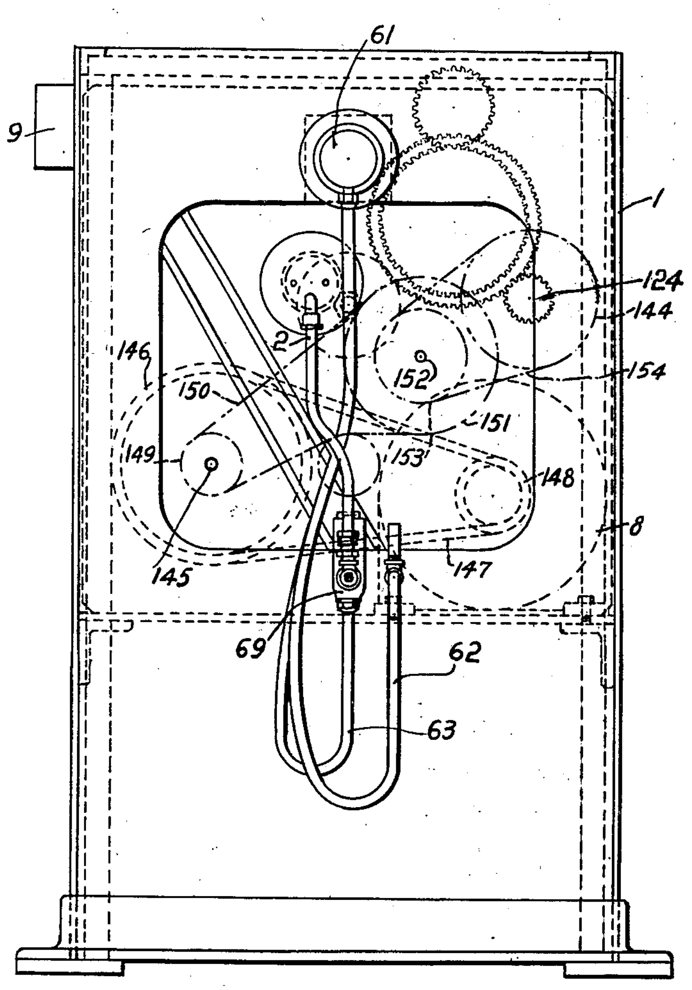
Fig. 4 is a vertical end view showing the drive and air cylinder as seen along the line 4—4 shown in Fig. 3, looking in the direction of the arrows.
Figure 8:
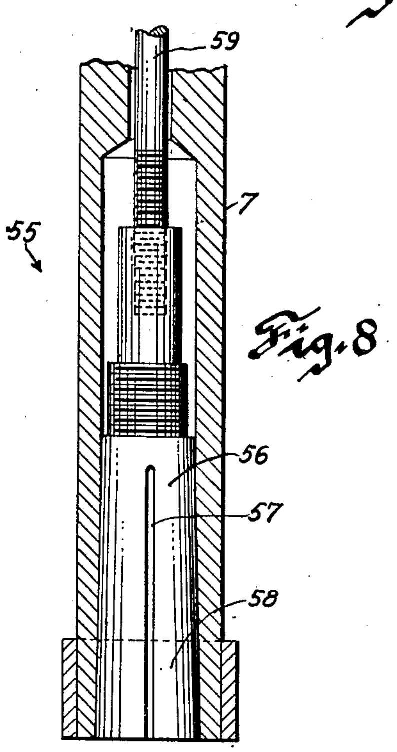
Fig. 8 is a central vertical sectional view of the armature supporting collet.
Figure 14:
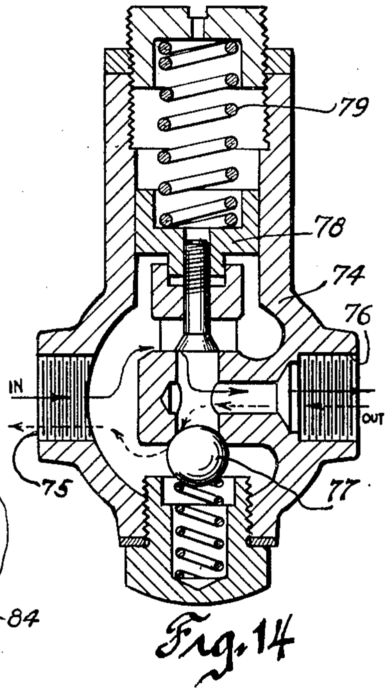
Fig. 14 is a vertical sectional view of the delayed action valve controlling the positioning cylinder.

The armature supporting shaft 7 has an air operated chuck at its forward end adapted to first hold an armature core A and later to automatically release the fully wound armature. The construction of the chuck is best shown in Fig. 8 and comprises a collet 56 divided by means of slots 57 into a series of gripping jaws 58 which contract upon the shaft of the armature core A upon a retraction of the draw rod 59 which extends rearwardly to a collet actuating cylinder 61, said actuating cylinder 61 being shown in Figs 3 and 4. The collet cylinder 61 is connected with a source of air supply by means of conduits 62—63 connected with a control valve 64 as shown in the piping diagram in Fig. 16. The air under pressure for operating the system is supplied from an outside source through the pipe 65 which enters a moisture removing reservoir 66 and which then passes to the pressure line 67 and through a solenoid operated four-way valve 68 which leads to the main cylinder 69 of the apparatus to which the shaft 7 is secured. The main air cylinder 69 moves bodily on the piston 71 and has a balancing pressure received through the line 72 actuating the positioning cylinder 60 to hold the operating assembly secured to cylinder 69 at a selected point. The main air cylinder 69 and its associated mechanism including the shaft 7 is moved to an unloading position with the forward chuck end of said shaft 7 in advance of the winding throat 6 and is also retracted to a loading position on the other side of said winding throat. Said valve 64 controls both the action of the collet 56 and the positioning cylinder 60 through the operation of a delayed action valve 74 which is shown in section in Fig. 14. This valve opens under pressure received through the port 75 from the air connection 63 from cylinder 61. Said valve 74 has a port 76 connected with line 72 leading to the positioning cylinder 60 and a ball valve 77 operative to permit flow of air in the direction indicated by the dotted arrows in Fig. 14 when pressure in port 75 is released. Said valve 74 also has a piston member 78 held in seated position by a spring 79 bearing thereon. When the pressure of the air in lines 62 and 63 builds up by reason of the closing of the collet 56 on the armature shaft, such pressure will raise piston member 78 to permit air to flow through valve 74 in the direction of the solid line arrows and line 72 into the positioning cylinder 60.

The positioning cylinder 60 preferably has a position area twice that of the main cylinder 69 so that when air is admitted into the main cylinder to hold the reciprocating mechanism and the chuck shaft 7 connected thereto in the loading position rearward of the winding throat 6, the air pressure need not be removed from the cylinder 69 inasmuch as the pressure in cylinder 60 acts on an area twice that acting on the main cylinder when moved and held in operating position. In this way the chuck shaft 7 is air cushioned in both directions. The operation of the system is such that when the valve 64 is operated, pressure is admitted into the cylinder 61 and as the pressure builds up the air flows through the valve 74 in the manner aforesaid and through the conduit 72 to the cylinder 60.

Figure 15:
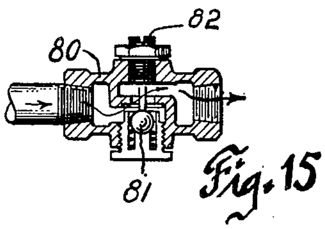
Fig. 15 is a vertical sectional view of an exhaust-regulating valve to control the rate of return of the main cylinder, outward movement of the collet mechanism, and the delayed movement of the positioning cylinder.

Installed in each of the air lines leading into opposite ends of piston 71 of main cylinder 69 is an exhaust regulating valve 80 which, as best shown in Fig. 15, has a spring loaded ball 81 constantly urged toward a seated position but held away from the seat a desired distance in accordance with the setting of the adjusting screw 82. Accordingly, whenever either line is connected to release pressure the air will flow through said valve 80 in the direction of the arrows in Fig. 15 at a desired rate of speed.

Figure 13:
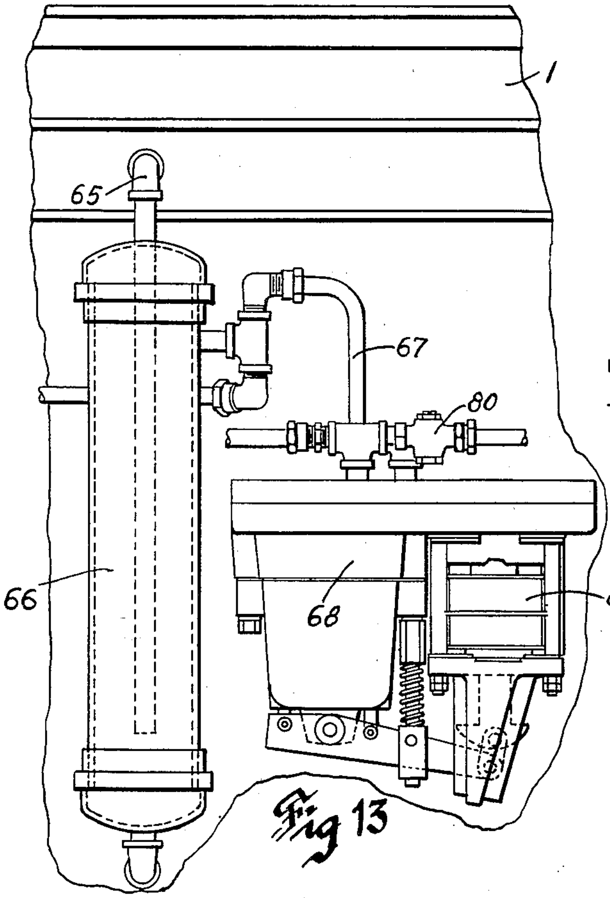
Fig. 13 is an elevation showing the moisture-removing tank and air line connections and the solenoid release, as seen along the line 13—13 shown in Fig. 2A.

The solenoid operated four-way valve 68 is shown in Fig. 13 and the solenoid for actuating the same is represented by the numeral 84 in said figure.

*Roll over and skew mechanism*

Figures 18, 19:
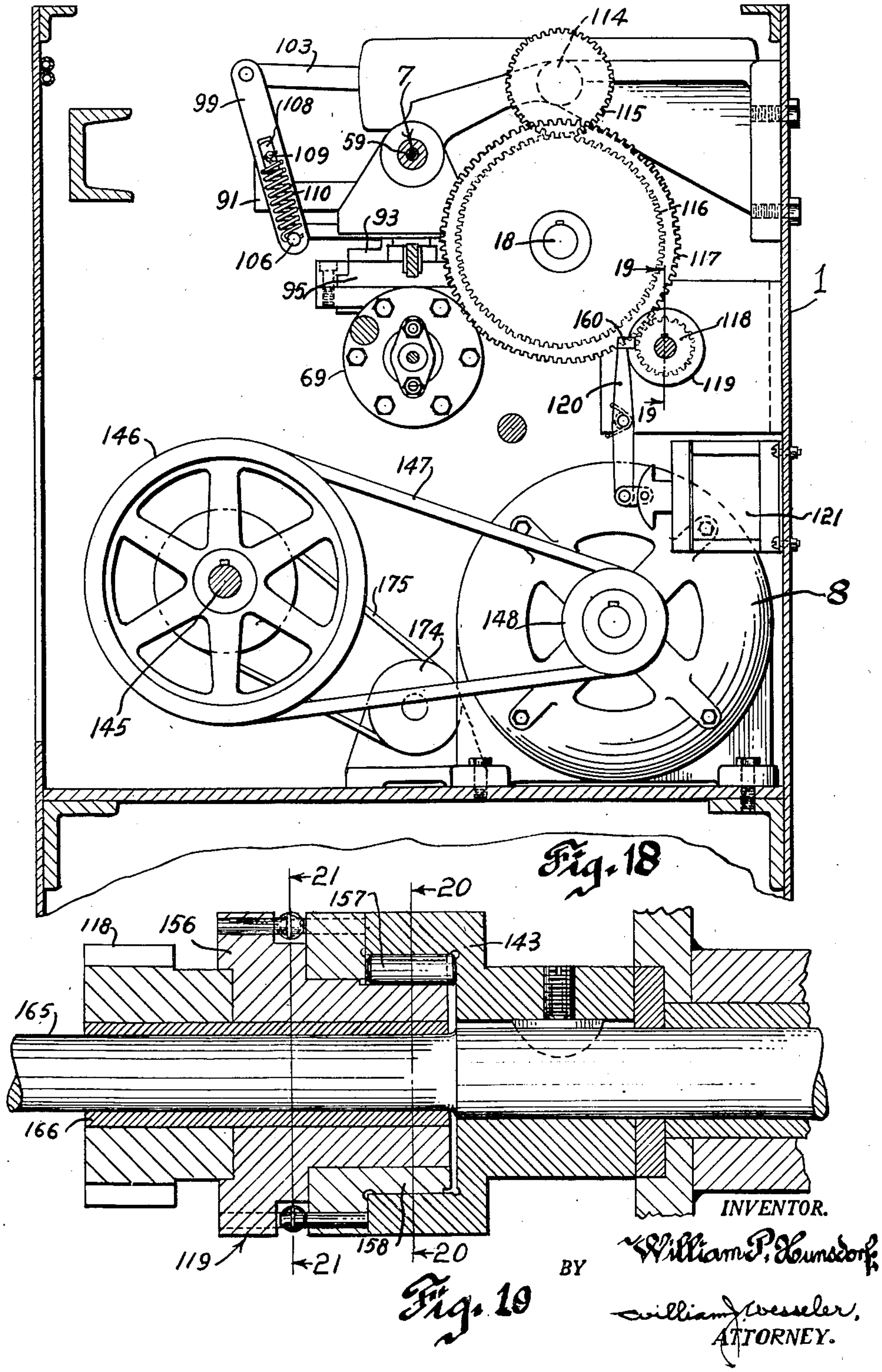
Fig. 18 is a vertical sectional view showing the motor and jack shaft, as well as the end of main air cylinder, the head drive shaft to rotate the feeds, the collet shaft, the roll-over and skew mechanism, and the solenoid control of said mechanism.
Fig. 19 is an enlarged central vertical section of the roll clutch mechanism, as seen along the line 19—19, shown in Fig. 18, looking in the direction of the arrows.
Figures 9, 17, 20, 21:
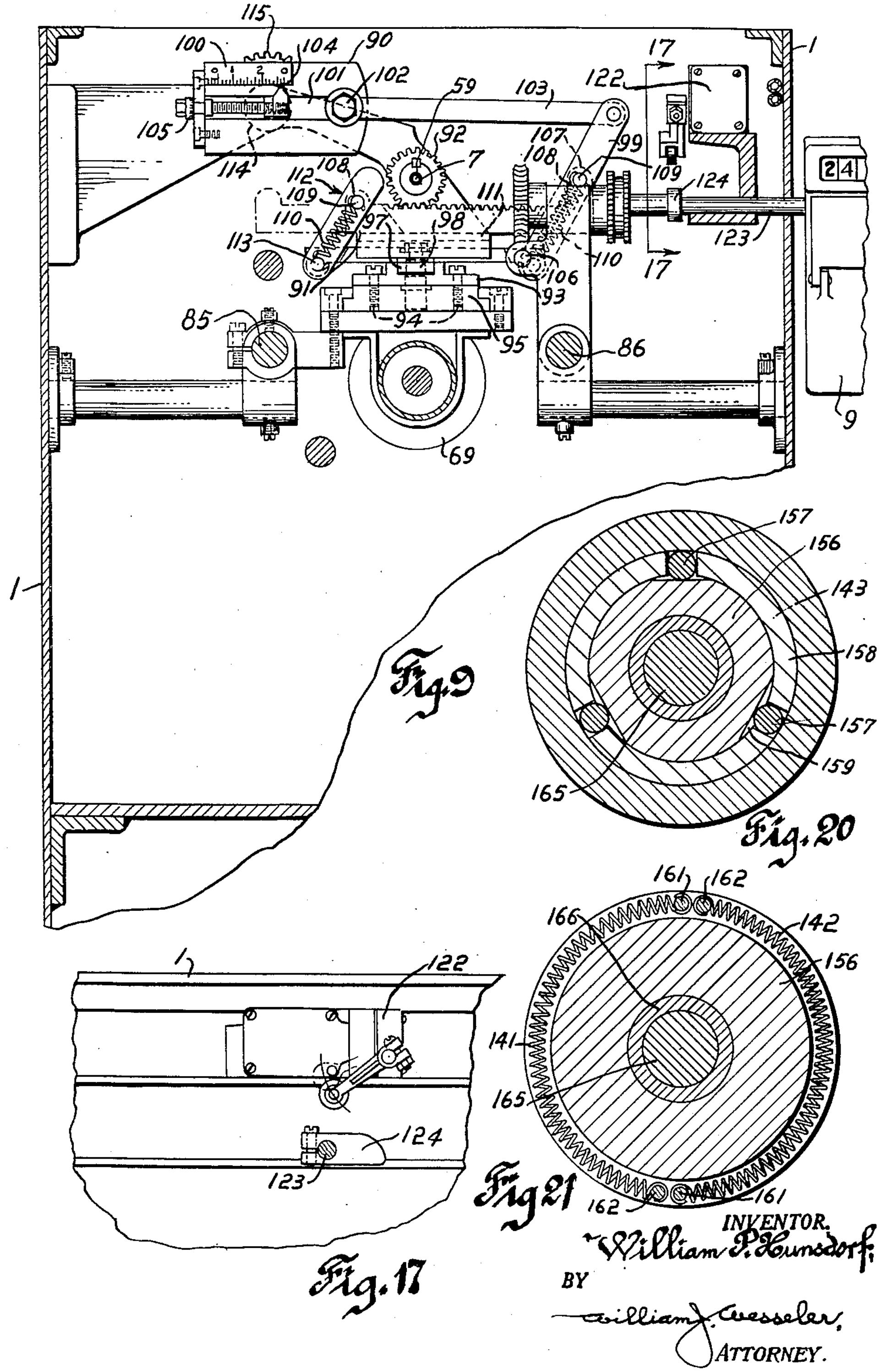
Fig. 9 is a vertical sectional view showing the roll-over skew and timing mechanism, and taken along line 9—9 as shown in Fig. 3, looking in the direction of the arrows.
Fig. 17 is a fragmentary detail view taken along the line 17—17 in Fig. 9 showing the limit switch looking in the direction of the arrows.
Fig. 20 is a sectional view taken along the line 20—20 shown in Fig. 19, looking in the direction of the arrows.
Fig. 21 is a sectional view taken along the line 21—21, as shown in Fig. 18, looking in the direction of the arrows.

(Figs. 3, 9, 18)

When conventional coil winding is to be carried out, the roll-over and skew mechanism for causing laying of the wires across the ends of the armature core being wound after each half-reciprocation of the shaft 7 preferably takes the form shown in detail in Fig. 9. The armature supporting shaft 7 is oscillated about its longitudinal axis by a crank arm 90, which actuates rack 91 and pinion 92 mechanism positioned at a mid point of the housing 1 in approximately the plane of the timing unit 9.

Shaft 7 is also given a secondary axial rotation when armature cores having diagonal or skew slots are to be wound. The skew movement is provided for by means of an adjustable centrally slotted skew plate 93 which, as shown in Fig. 3, may be set at an angle to the straight path of reciprocation of the armature supporting shaft 7. This angular adjustment is made by setting the plate 93 at the desired skew angle and securing it in such position by means of the set screws 94 which engage a slide plate 95 through arcuate slots 96 (Fig. 3) in the skew plate 93. The rack bar 91 has the slide block 97 on its under side riding in the slot 98 of the skew plate 93 and the rack 91 is shifted laterally to rotate the armature supporting shaft 7 through the pinion 92 which has its hub slidably keyed to the armature supporting shaft 7.

The travel of the rocker arm 99 for the rack bar 91 engaging the pinion 92 keyed to the armature supporting shaft 7 is adjusted by means of the scale 100 shown in Fig. 9 to a preselected slot and then the rack bar 91 will be moved the requisite distance to aline the selected slot with the feeding fingers 25 in the winding throat 6.

The mechanism for shifting the rack bar 91 laterally so as to rotate the pinion 92 keyed upon the armature supporting shaft 7 comprises the adjustable crank arm 90, having a slot 101 in which a crank pin 102 for a connecting rod 103 is supported for adjustment with the scale 100 and pointer 104 by means of an adjusting screw 105 which moves crank pin 102 along slot 101, said connecting rod 103 being connected with the rocker arm 99 supported on a pivot 106 and connected intermediate its ends with the rack bar 91. By changing the adjustment of the crank arm 90, the angular displacement of pinion 92 keyed to the armature supporting shaft 7 is correspondingly varied.

The rocker arm 99 has a slot 107 formed therein in which a block 108 is slidable. A pin 109 extends through said block 108 and through ears formed on the rack bar. A spring 110 hooked over said pin 109 and the pivot 106 constantly urges the rack bar downwardly against its guide 111. Arm 112 has another block 108 therein for operation upon by another spring 110 which is hooked over the pin 109 and the pivot 113 of said arm so as to constantly urge the other end of the rack bar into engagement with its guide 111.

As shown in Figs. 9 and 18, the crank arm 90 is pivoted on the stub shaft 114, which carries the gear wheel 115 which intermittently rotates the crank arm 90 through 180° in a clockwise direction as viewed in Fig. 9 by means of which the free end of the adjustable member 102 is first moved in a downward direction which draws the connecting rod 103 inwardly to the left together with the upper end of the rocker arm 99 attached to the rack bar 91, thus moving the rack bar 91 in a direction away from the counter mechanism 9 and rotating the armature supporting shaft 7 in a clockwise direction and then upon rotation of the crank arm 90 through the remaining 180° in the same direction, the connecting rod 103 is moved toward the right to return the rack bar 91 to the position shown. The gear wheel 115 is meshed with a gear 116 (see Fig. 18) which is fastened to gear 117, said gear 117 meshing with a pinion 118 on the driven member of a one-revolution roll clutch 119.

A locking latch 120, shown in Fig. 18, is adapted to engage projections in the roll-over clutch 119 and hold it in non-rotating position for the length of time required for each longitudinal stroke of the armature supporting shaft 7. The latch 120 is released by the solenoid 121 being energized from the limit switch 122, as shown in Figs. 9 and 17, and the shaft 123 driving the timing unit 9 carries the arm 124 to actuate the limit switch 122.

The power for operating the skew mechanism is derived from the worm shaft 125 which operates the worm wheel 126 driving the timer shaft 123 which carries the limit switch contact arm 124 (Figs. 9 and 17). The shaft 123 carries a sprocket 127, which is connected by a chain 128 (Fig. 3), with a sprocket 129 mounted on a shaft 130 at the end of which is a crank arm 131, said crank arm being connected by means of a link 132, which reciprocates the slide plate 95 and the overlying skew plate 93, in harmony with the reciprocating motion of the armature supporting shaft 7.

Figures 23, 24, 25, 26:
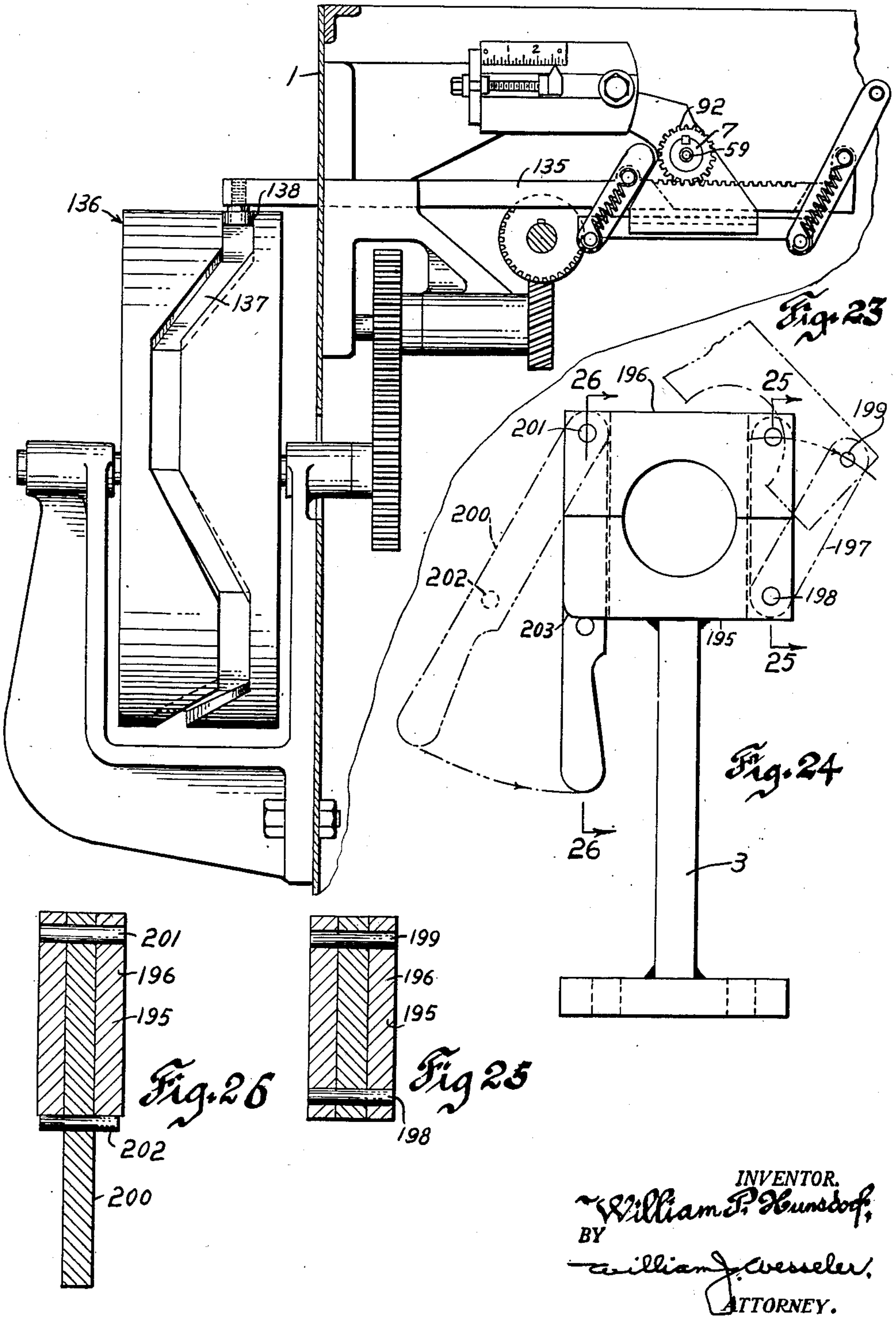
Fig. 23 is an enlarged sectional elevation of a modified form of cam-operated roll-over mechanism.
Fig. 24 is a front elevation of the clamp and pedestal for holding the wound armature.
Fig. 25 is a sectional view taken along the line 25—25 of Fig. 24 and shows the linkage for the armature clamp.
Fig. 26 is a sectional view taken on line 26—26 of Fig. 24 and shows the clamping handle.

A modified form of the roll-over and skew mechanism is shown in Fig. 23.

This modified form is adapted to control the roll-over in accordance with any pattern of distributive winding which may be found desirable for the work in hand.

In each instance, the armature supporting shaft 7 is rotated by a pinion 92 keyed thereto, and meshing with a rack bar 135 which is moved laterally to rotate the armature supporting shaft 7 through a predetermined angle to bring the return slot of the armature core in alignment with the wire-feeding members 25.

In this modified form a cam drum 136 is provided with a cam track 137 designed to shift a terminal roller 138 on the rack bar 135 the necessary distance to rotate the pinion 92 slidingly keyed on the armature supporting shaft 7 which will turn the armature the requisite number of slots in accordance with the shape of the cam track 137 and thus provide for a selected type of distributive winding.

*Roll-over clutch*

(Figs. 19, 20 and 21)

The roll-over clutch as shown in Figs. 19, 20 and 21 comprises a three-section unit with peripheral springs 141—142 tending to relatively rotate the driven and spider sections thereof to engage the former with a driving section. One part of this unit 143 is operated continuously by a sprocket 144 from the jack shaft 145. The jack shaft 145 extends lengthwise of the housing 1 and has keyed thereto a pulley 146 (Fig. 18) driven by a belt, said belt running over a pulley 148 on the drive shaft of the electric drive motor 8. Keyed to the rear end of said jack shaft 145 (see Fig. 4) is a sprocket 149 over which a chain 150 is trained, said chain passing over a sprocket 151 on a shaft 152. Integral with the sprocket 151 is a smaller diameter sprocket 153 having a chain 154 thereover and over the sprocket 144.

Fitted within the driving section 143 of the roll clutch is a driven section 156 and between said sections 143 and 156 is a series of rollers 157 which are held in circumferentially spaced relation by means of a spider section 158. The driven section 156 is formed with flats 159 thereon tangent to a circle inscribing said rollers 157 and having its center at the center of the clutch. In the position of the parts shown in Fig. 20 the clutch is in a disengaged position with the driving section 143 free to rotate independently of the driven section 156 and the spider 158. Each of said sections 156 and 158 has a block 160 secured thereto (see Fig. 18) for engagement with the upper end of the latch 120. When the latch 120 is shifted away from the blocks 160 by the energization of the solenoid 121, the springs 141 and 142 which are hooked over pins 161 on spider 158 and pins 162 on the driven section 156 cause an angular displacement of said sections with respect to each other thereby causing the rollers 157 to be wedged between the flats 159 and the inner wall of the driving section 143, thus allowing the driving section 143 to transmit rotating power to the driven section 156. The previously-described sprocket 144 is keyed on a shaft 165 which extends through the roll clutch and has keyed thereon the driving section 143. The driven section 156 is rotatable on said shaft 165 as for example on the bearing 166 and has fixed thereon the pinion 118. When the driven section 156 is rotated by reason of the engagement of the clutch as aforesaid, the corresponding rotation of said pinion 118 will drive the gear 117 in mesh therewith and through the gears 116 and 115, the roll-over crank arm shaft 114 will be driven one revolution of the driven section 156 and pinion will effect one-half revolution of crank 90.

The intermittent rotation of the driven section 156 and the intermittent rotation of the pinion 118 in addition to operating the roll-over crank arm shaft 114 also drives the shaft 18 which rotates the pinion 15 meshed with the ring gear 16, thus transmitting intermittent rotary movement to the wire feeding members 15 through the bevel gears 32 and 34, the latter being integral with the ring gear 16. The power is thus transmitted to the shaft 18 through the gear 117 which is keyed thereonto.

The latch 120 will re-engage every revolution so as to repeat the operation to position the slots of the armature into alignment with the wire feeding fingers 25 for a winding operation.

*Timing mechanism and control*

Figure 22:
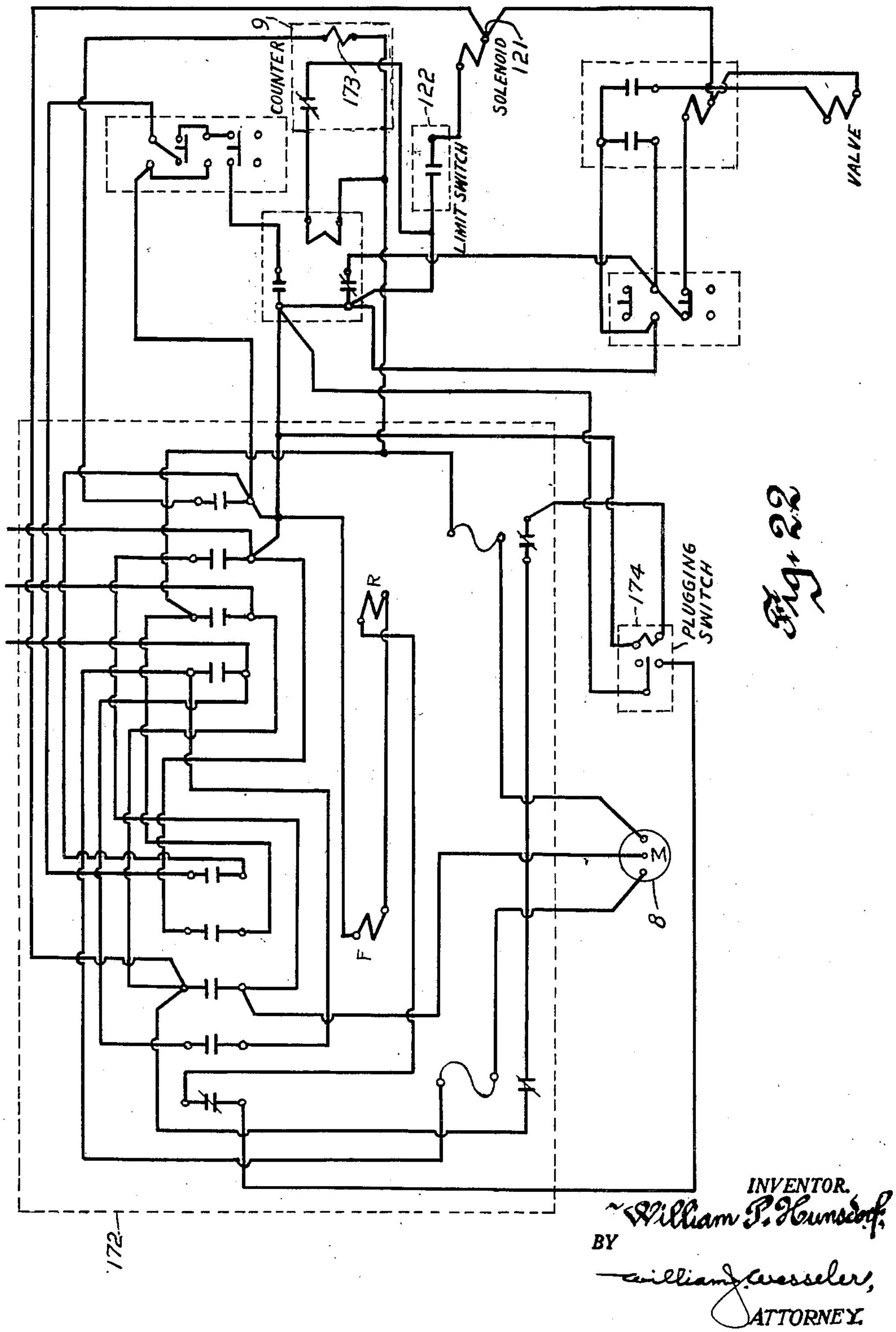
Fig. 22 is a wiring diagram showing the electrical units and controls and connections therefor.

(Fig. 22)

The worm shaft 125 receives its power from a chain driven sprocket 171 through a sprocket (not shown) keyed on the front end of the jack shaft 145, the counter 9 being operative to count each half reciprocation of the armature supporting shaft 7. When the counter 9 registers the proper number of turns previously set, it makes an electrical contact which actuates the magnetic reversing switch 172 (Fig. 22) for the main motor 8 driving the machine.

The magnetic reversing switch 172 also closes an electrical circuit which energizes a reset solenoid 173 in the counter 9 preparing it to repeat the cycle of turns for the next armature to be wound.

The reversing switch 172 is controlled automatically by the plugger switch 174 which is belt-driven by belt 175 (Fig. 18) from the jack shaft 145. When the plugger switch 174 comes to rest from rotation, it automatically disconnects all power to the motor 8, allowing it to remain in stopped position. The counter shaft 123 has the arm 124 (Figs. 9 and 17) which actuates the limit switch 122 which energizes the roll clutch release solenoid 121 at each end of the armature supporting shaft 7 reciprocation and allowing the roll clutch 119 to engage the roll-over mechanism during the latter portion of each reciprocation of the armature-supporting shaft 7 and simultaneously rotating the wire feeding fingers 25 180°.

*Wire terminal clamping means*

Figures 28, 29, 30, 31, 32:
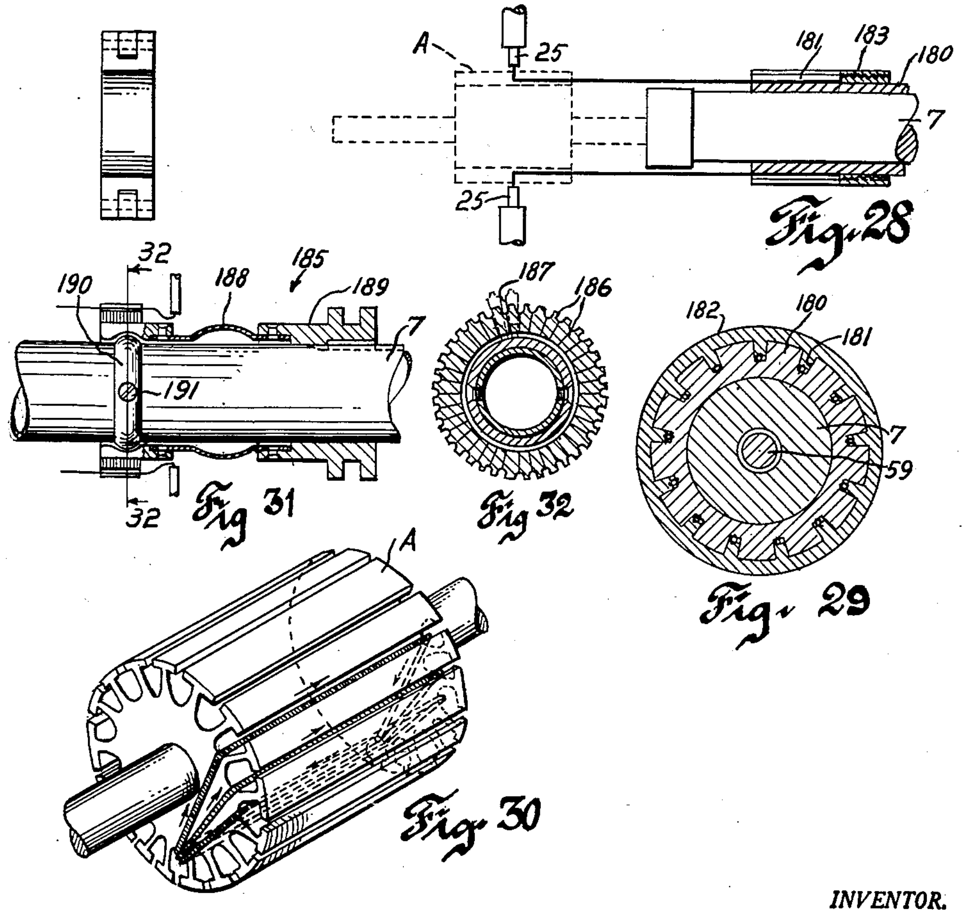
Fig. 28 is a central vertical sectional view showing the method of lacing a new armature into the spaced wires between the winding fingers and the false commutator for front loading.
Fig. 29 is a sectional view taken on line 29—29 in Fig. 27.
Fig. 30 is a fragmentary perspective view showing one method of applying distributive winding to the slots of the armature core.
Fig. 31 is a central vertical sectional view of the segmental automatic wire anchorage clamps, carried on the chuck shaft.
Fig. 32 is a transverse sectional view of the clamping members as seen along the line 32—32, shown in Fig. 31, looking in the direction of the arrows.

After an armature A has been fully wound as described in detail in the ensuing description, the wires are clamped in what may be designated a false commutator such as shown in Figs. 28 and 29 or they may be anchored in an automatic segmental clamping unit such as shown in Figs. 31 and 32.

Figure 27:
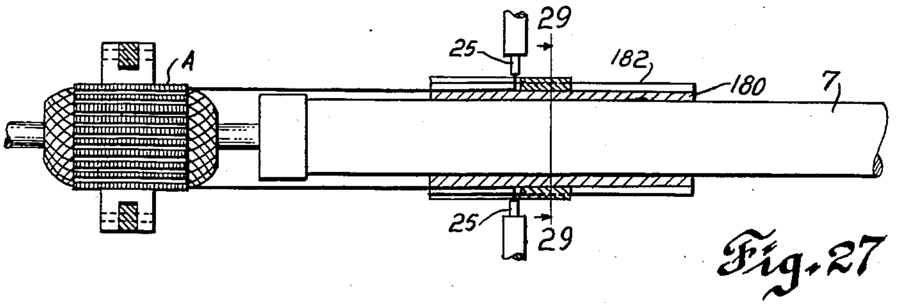
Fig. 27 is a central vertical sectional view showing the false commutator in position upon the chuck shaft.

The clamping device shown in Figs. 27 and 29 discloses a sleeve 180 having longitudinal slots 181, with half-round recesses within which the wire ends are received and clampingly engaged. The inner and outer sleeves 180 and 182 are slightly conical and wedge upon each other and are moved into clamping engagement with the wires by means of a screw threaded collar 183, supported on the chuck shaft 7 which brings the half round recesses of said inner and outer sleeves 180 and 182 into gripping relation to the wires within the recesses.

The wires may also be automatically engaged by the clamping device 185, shown in Figs. 31 and 32. This device comprises radially movable elements 186 forming a disc-like structure when in contact with each other, the radial lines of contact of the segments forming gripping surfaces 187, which may be serrated or roughened to securely grip a wire therebetween. Each segment 186 is held on a leaf spring 188 which is secured to a collar or hub 189 slidably engaged over the end portion of the chuck shaft 7, the free ends of said springs 188 being firmly engaged with the respective segments 186. The cam ring 190 is secured to the chuck shaft 7 by a set-screw 191, beneath the spring members 188 and the under surface of the springs ride over the cam ring 190 as the springs move forward, and the springs and segments are thus moved radially outward through such cam action, and the gripping edges of the segments will be separated as they move outwardly a distance sufficient to grip the respective wires, and will simultaneously be clamped upon the wires when the springs have passed over the cam ring 190 and the segments 186 are again drawn radially inward. Thus, the wires are individually clamped by the segments 186 at a point intermediate the wound armature and the plane of the feeding fingers 25, and the wires may be severed adjacent the clamping segments 186 and thus free the wound armature from the apparatus, while at the same time, the wires are all firmly held in proper registry for the insertion of a new armature core to be wound at such point in the apparatus.

Without the clamping means just described, the wound armature A may be supported on the standard 3 in advance of the winding throat 6 and thus provide a conical arrangement of wires, within which a new armature may be inserted from behind the winding throat upon retraction of the chuck shaft 7, with such wires lacing into the slots of the new armature.

The support for holding the wound armature in advance of the winding throat 6 is shown in Figs. 24, 25 and 26. The clamping means for the armatures comprises a fixed plate 195 and a movable plate 196 hingedly engaged therewith by means of a link 197, pivoted to the fixed plate by means of the pivot pin 198, and pivoted to the movable plate by means of a pivot pin 199. When the plates 195 and 196 are in clamping position the link 197 is received within the respective slots at the ends of said plates. At the ends of the plates opposite the position of said link 197, an elongated member or handle 200 is pivoted to the movable plate 196 by means of a pivot pin 201, and having a locking pin 202 therefor, the armature carried thereby to be reciprocated through the winding throat 6 and this reciprocation coupled with the intermittent roll-over of said shaft 7 and the armature carried thereby lays the wires from the feeding fingers 25 into the armature slots and across the ends of the armature core.

*Radial movement of feeding fingers*

(To position wires in armature slots following each half reciprocation of the armature supporting shaft 7 and the armature A carried thereby)

This movement of the fingers 25 is accomplished through the sliding ring 19 which engages the inner ends of the bell cranks 21. The reciprocation of said ring 19 is effected through bars 230 which are connected to said ring and extend rearwardly through suitable bearings in the housing 1 and have their rear ends pivotally connected to the upper ends of the arms of a yoke 231. The intermediate portion of the yoke arms are pivotally connected to the housing 1 as at 232 and the lower end of the yoke is formed with a cam follower 233 engaged in a cam track formed around the periphery of the cam drum 234. Said drum 234 has a gear 235 thereon which meshes with a drive pinion 236 keyed to the forward end of shaft 152. Said shaft 152 is continuously rotated during the winding cycle whereby the fingers 25 are periodically moved radially inward and outward of the winding throat 6 at the end of each half reciprocation of the armature supporting shaft 7, said fingers being moved inward as the roll-over of said shaft 7 and the armature carried thereby starts and moves outward as the roll-over operation of said shaft and the armature is completed. Thus, as the armature supporting shaft 7 and the armature carried secured thereto at a position when the plates 195 and 196 are in closed clamping position to bear against the under surface of the fixed plate 195. The forward edge 203 of the fixed plate 195 is slightly rounded to permit the locking pin 202 to ride past the corner when it is moved to latching position.

*Armature supporting shaft reciprocating mechanism*

(Figs. 3, 10, 11 and 12)

The armature supporting shaft 7 is mounted on bearings at each end of the housing 1 and any desired number of bearings therebetween for reciprocation longitudinally so as to position an armature carried thereby on one side and the other of the winding throat 6. The mechanism for so reciprocating the armature supporting shaft 7 comprises a connecting rod 210 pinned to a sleeve 211 which is rotatable on said shaft 7 and held in a fixed longitudinal position on said shaft as by means of the collars 212 fixed on said shaft and spaced apart a distance substantially equal to the length of said sleeve 211. The other end of said connecting rod 210 is pivotally connected at 213 to an adjustable slide 214.

A worm wheel 215 is driven by a worm 216 on the shaft 125, the worm wheel 215 having a transverse slideway 217 with the adjustable slide 214 therein. Thus, the radius of the pivot pin 213 may be adjusted relative to the central stub shaft 218 of the worm wheel 215 by means of an adjusting screw 219 turned by means of the head 220, an indicator scale 221 is provided to show the degree of adjustment and a pointer 222 traverses the scale as the adjusting screw 219 is turned.

The worm wheel 215 is continuously rotated during the winding operation to cause the armature supporting shaft 7 and, thereby moves axially in one direction through the winding throat 6, the wires will extend from one end of the armature to the other in a somewhat conical form and then at the end of the stroke of the shaft 7 and armature, the inward movement of the fingers at the commencement of the roll-over operation will pack the wires in the armature slots.

*The winding operation*

At the beginning of the operation of the apparatus the armature supporting shaft 7 is in a position forward of the winding throat 6 and the wires which lead radially to the winding throat 6 through the tubular feeding members 25 are clamped in a false commutator.

An armature core A is then inserted into the collet 56 in the end of said shaft 7 with the armature slots in alignment with the feeding members 25. Clamping of the armature core A in said collet is effected by manual operation of the valve 64 to allow air under pressure to flow from line 65, through moisture removing reservoir 66, valve 64, and line 62 into the collet actuating cylinder 61 whereby the draw rod 59 connected to said collet and to the movable element of said cylinder 61 is drawn rearwardly to contract the collet 56 on the shaft of the armature core.

As the pressure builds up in the cylinder 61 the valve 74 will allow air to enter the positioning cylinder 60 to extend the rod thereof to operating position.

Figure 16:
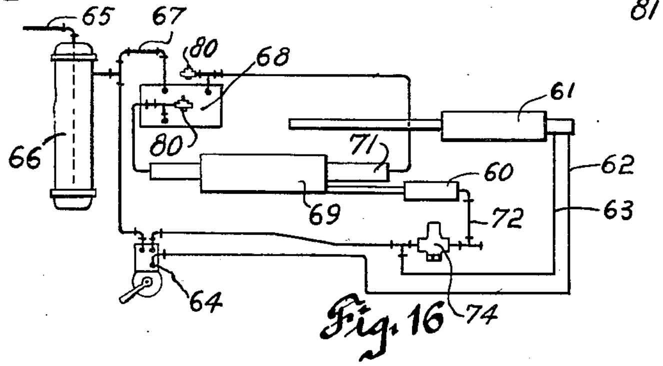
Fig. 16 is a diagrammatic view showing the air cylinders and air control lines and valves associated therewith.

The push button of a switch in circuit with the solenoid 84 is then pushed to energize said solenoid and thereby actuating the four-way valve 68 and allowing the air under pressure leading thereto by way of pipe 67 to pass therethrough to enter the piston rod 71 at the right-hand end as viewed in Fig. 16 whereby to retract the cylinder 69, said cylinder 69 carrying the armature supporting shaft 7 through the reciprocating mechanism shown in Figs. 3, 10, 11 and 12. Such movement is possible because of the slidable keying of the worm 216 on jack shaft 125. The armature core A is positioned immediately forward of the winding throat 6 with the wires from the feeding members 25 disposed in a generally cylindrical form ready to enter the slots of the armature core.

The drive motor 8 is now energized by actuating a suitable switch. At this stage of the operations, that is with the armature on one side of the winding throat 6, the roll clutch 119 is engaged by the momentary energization of solenoid 121 which permits the blocks 160 on the driven and spider sections 156 and 158 to pass the end of the latch 120 whereby the springs 141 and 142 angularly displace these sections to wedge the rollers 157 between the driving section 143 and the driven section 156. After the blocks 160 pass the end of the latch 120 the solenoid 121 is de-energized whereby said blocks 160 at the completion of one revolution of the sections 156 and 158 re-engage the end of said latch.

During such one revolution of the driven section 156 through driving section 143 the roll-over crank 90 is turned 180° through pinion 115 whereby, through the rod 103 and link 99 the rack bar 91 is shifted in one direction transversely of the axis of the shaft 7 to rotate the pinion 92 keyed on said shaft 7; the fingers 25 are rotated 180° about their axes to preclude twisting on each other of the two or more wires passing through each finger, during the roll over of the armature core A, by the rotation of shaft 18 which is geared to the driven section 156 of the roll clutch and which is geared to the fingers 25 through the pinion 15 on said shaft in mesh with ring gear 16, and through the bevel gear 34 on said ring gear 16 in mesh with individual bevel pinions 32 slidably keyed on the respective fingers 25.

The fingers 25 are moved radially inward at the beginning of the roll-over operation through the rotation of the cam drum 234 through gear 235 thereon meshing with a pinion 236 on shaft 152 whereby the cam on said drum draws the follower 233 on yoke 231 in a direction to draw the bars 230 and ring 19 rearwardly and thereby actuate the bell cranks 21 to move the outer ends engaged with the fingers 25 radially inwardly. Said fingers 25 are similarly moved radially outwardly at the end of the roll-over operation by forward movement of the bars 230 and ring 19.

The armature core is thus positioned so that diametrically opposed slots are now in alignment with the fingers 25 if the armature is to be wound with the coils extending across diametrically opposed slots.

During the aforesaid roll-over movement of shaft 7 and the armature core A clamped therein, the rotation of the fingers 25 and the inward and outward movement of said fingers, the crank pin 213 has rotated through that portion of its path which effects, but a slight reciprocation of the shaft 7 through the rod 210 connected to said crank pin and to said shaft.

Next the continued rotation of the crank pin 213 causes the shaft 7 and armature core A clamped therein to pass rearwardly through the winding throat to lay the wires into the armature slots and again at the end portion of the stroke of the shaft the roll-over movement and the finger rotation and reciprocation is effected by engagement of the roll clutch 119 in the manner aforesaid, the rack bar 91 being returned to its starting position by rotation of the crank 90 the remaining 180° to thus rotate the shaft 7 in an opposite direction through the pinion 92 in mesh with said rack bar 91. The armature core A is thus rotated to position the original slots in alignment with the fingers 25 ready for the beginning of the second turn of the armature coils in the case of a lap-winding, each coil passing successively through one slot, across one end of the armature core, through a diametrically opposed slot, and across the other end of the armature core to such one slot.

The aforesaid operations are repeated until the desired number of turns of the coils has been wound, this being determined by the setting of the counter 9. At the conclusion of the winding operation the reversing switch 172 is automatically actuated by the counter operated contact 173. Power is disconnected from the motor 8 forward rotation contact of said switch 172 and applied as a brake by the reverse contact of switch 172 until the motor 8 comes to rest. The reversing switch 172 also actuates the four-way valve 68 causing the shaft 7 and the wound armature to be moved forward through the winding throat 6 by the consequent reversing of the cylinder 69.

Simultaneously with the reversing switch actuation as aforesaid, a contact on an arm of said switch energizes a solenoid in said counter 9 to reset the switch 173 ready to repeat the cycle.

The wound armature is then clamped in the unloading pedestal 3. The valve 64 is operated to release air on cylinder 61 and thus open the collet to release the wound armature. The wires between the clamping mechanism and the wound armature are then severed, the wound armature removed from the pedestal 3 and a new armature inserted into the collet 56.

In the case where the clamping mechanism is not employed the wires leading rearwardly and axially relative to the chuck shaft 7 from the slots of the wound armature to the feeding fingers and thence radially outwardly through said fingers will form a hollow cylinder open at the rearward side and a new armature may be placed in the chuck shaft 7 from the rear side of the throat 6 into the hollow cylinder of wires whereby the axial portion of the wires will be disposed in the slots of the new armature. The first turn of the roll-over mechanism will then lock the wires in position on the new armature and the wound armature is then removed, the wires being severed and where necessary the wires may be secured on the shaft of the new armature. The winding on the new armature can then be carried through to the requisite number of turns.

In the case of winding armatures having skew slots the plate 93 will be adjusted to the proper angle whereby during the reciprocation of the shaft 7, the rack bar 91 will be given a slight movement transverse of shaft 7 through the engagement of the slide block 97 of said rack bar engaging in the slot 98 of plate 93. Such movement of the rack bar 91 will, through the pinion 92 in mesh therewith, effect a desired rotation of shaft 7 during its longitudinal stroke, thus maintaining the fingers 25 aligned with the skew slots in the armature core.

*Distributive winding*

It is desirable to have the electric motor casing compact and this in turn limits the length of the armature cores and requires that the projections or ends of the coils on the armature pole pieces be snugly seated and free of build-up due to overlapping coils and frequent cross-over areas where the coils are superimposed on adjacent coils. This build-up or excessive projection of the coil ends at the ends of the slots of the armature cores may be kept at a minimum by using a method of distributive winding whereby instead of winding coils between two slots diametrically opposite each other the winding on the opposite side is spread over a plurality of slots as shown in Fig. 30, thus having a V-shaped pattern at each end, the open spaces of the V permitting the forming of a very compact end structure and one which will resist the tendency of the wires to breathe or expand under the influence of the centrifugal force. Such distributive winding is accomplished as by the mechanism illustrated in Fig. 23 which is to be regarded merely as typical of any of a number of mechanisms by which such winding may be accomplished.

I therefore particularly point out and distinctly claim as my invention:

1. An apparatus of the character described comprising a casing, a motor within said casing, a plurality of shafts supported in the end walls of said casing, one of said shafts provided with an armature holding collet at its forward end, wire feeding fingers on the forward end of said casing and having an operative mechanism associated therewith mounted on trackways within said casing, a fluid pressure cylinder associated with said shaft for operating said collet and a system of fluid pressure cylinders for bodily moving said shaft and its associated mechanism from a position within said casing rearwardly of said wire-feeding fingers to a position in advance thereof, said mechanism having a worm shaft associated therewith and a pair of worm wheels driven from said worm shaft, one of said worm wheels having a crank shaft for reciprocating said armature supporting shaft, a counter mechanism shaft operated by the other of said worm wheels, said counter mechanism shaft also having mounted thereon an arm which actuates a limit switch once for each revolution thereof, and said shaft also having mounted thereon a sprocket delivering power therefrom by a chain drive to a sprocket mounted adjacent the rear wall of the casing, said last-named sprocket having a crank-arm attached thereto, a skew plate slide, said crank-arm connected by a link to said skew plate slide, thereby producing a reciprocating movement of the skew plate slide in timed chuck shaft, a gear on said chuck shaft, a roll-over gear rack engaged with said gear, said skew plate slide being slidably engaged with a block linked to the roll-over rack, causing the chuck shaft to have a rotating movement during its reciprocation.

2. An apparatus of the character described having in combination a casing, a pair of slide rails mounted on the side walls adjacent the upper portion of said casing, an armature supporting unit slidably mounted on said slide rails, a guide plate supported on said unit, a sliding plate having a central slot supported for sliding movement on said guide plate, means for angularly adjusting said central slot, a transversely movable bar having a portion slidably fitting within said central slot for causing a predetermined degree of transverse movement of said rack bar upon movement of said slide plate, a pinion axially slidably keyed on the armature supporting shaft and engaging said rack bar and adapted to rotate said shaft proportionately to the movement of said rack bar through said slide plate, and means for independently actuating said rack bar to rotate said armature supporting shaft.

3. An apparatus of the character described having in combination a casing, a pair of slide rails mounted on the side walls adjacent the upper portion of said casing, an armature supporting unit slidably mounted on said slide rails, a guide plate supported on said unit, a sliding plate having a central slot supported for sliding movement on said guide plate, means for angularly adjusting said central slot, a transversely movable rack bar having a portion slidably fitting within said central slot for causing a predetermined degree of transverse movement of said rack bar upon movement of said slide plate, a pinion axially slidably keyed on the armature supporting shaft and engaging said rack bar and adapted to rotate said shaft proportionately to the movement of said rack bar through said slide plate, means for independently actuating said rack bar to rotate said armature supporting shaft, and a pointer and gauge associated with said independent means for adjusting the degree of rotation of said armature supporting shaft.

4. An apparatus of the character described having in combination a casing, a motor mounted within said casing, a jack shaft extending the length of said casing, power transmission means at each end of the jack shaft, means for driving a worm shaft connected with said jack shaft adjacent the front wall of said casing, a worm wheel adapted to be driven by said worm shaft, a crank pin adjustably mounted on said worm wheel, a crank arm adjustably connected with said crank pin and connected to an armature supporting shaft for reciprocating the same, a counter mechanism supported on one side of said casing, a second worm wheel adapted to be driven by said worm shaft for driving said counter mechanism, a timing contact carried on said counter mechanism, a limit or roll over control switch in circuit with said motor and adapted to be actuated by said counter mechanism.

5. An apparatus for winding armature coils, having radially positioned wire-feeding fingers around a winding throat, a chuck shaft for holding an armature, means for reciprocating said chuck shaft in said winding throat, means for rotating said chuck shaft intermediate said reciprocation, means for releasing the wound armature from said chuck shaft, a clamp for supporting the wound armature positioned in advance of the chuck shaft, and in spaced relation to the wire feeding fingers of said apparatus, and means carried on said chuck shaft adapted to expand radially and to individually grip and anchor the wires at a point intermediate the wound armature and the feeding fingers to permit severance of said armature from said apparatus and to anchor the wires in position for engagement by a new armature core.

6. An automatic clamping device for holding the wires of an armature winding machine at a point between a previously wound armature and wire feeding fingers of said machine which comprises a chuck shaft, a collar on said shaft, segmental radially movable clamping elements on said shaft, slidable, spring members mounted on said collar and having their free ends engaged with said segmental radially movable clamping elements, adapted to automatically and simultaneously grip and anchor the wires for winding an armature, at a point intermediate the wound armature and the wire feeding fingers, and means on said chuck shaft for radially moving said segmental elements upon the longitudinal movement of said collar.

7. A method of winding armatures which includes the steps of providing a plurality of circularly arranged wires extending axially from the slots of a previously wound armature to wire supply reels, moving an unwound, longitudinally slotted armature toward the wound armature to position the wires in the slots of the former, rotating the unwound armature a part turn relative to the wound armature to thereby hold the wires in the slots of the unwound armature.

8. A method of winding armatures which includes the steps of providing a plurality of circularly arranged wires extending axially from the slots of a previously wound armature to wire supply reels, moving an unwound, longitudinally slotted armature toward the wound armature to position the wires in the slots of the former, rotating the unwound armature a part turn relative to the wound armature to thereby twist the wires between the adjacent ends of the armatures and bend the wires between the other end of the unwound armature and the reels, and thereafter severing the wires between the armatures.

9. An apparatus for winding armature coils, comprising radially positioned wire-feeding fingers forming a winding throat, a reciprocable chuck shaft provided with chuck means at one end for gripping the shaft of an unwound armature, wire holding means on said chuck shaft adapted to hold wires from said fingers in circumferentially spaced relation corresponding with the circumferential spacing of the slots in an armature to be wound, means for reciprocating said chuck shaft between positions whereat said holding means and the unwound armature are disposed on the same side of the winding throat with the wires between said holding means and said fingers disposed in the armature slots and said holding means and the armature are on opposite sides of the winding throat, and means for rotating said chuck shaft, and thus the armature gripped thereby, a part turn at the end of each stroke of said shaft.

10. The apparatus according to claim 9 characterized further in that control means are provided to operate said means for rotating said shaft when said holding means and the armature are on opposite sides of the winding throat and prior to the initial stroke of said shaft to the first-named position whereby the wires extending between said holding means and said fingers are wrapped around the armature shaft.

11. A method of winding armatures of the type which include a slotted body and a shaft projecting from the opposite ends of the body which comprises the steps of providing a winding throat defined by a plurality of circularly arranged wires which extend radially inwardly to a wire clamping means, positioning the armature so that the body thereof and the wire clamping means are disposed on opposite sides of such winding throat with one end portion of the shaft extending into such winding throat, rotating the armature and wire clamping means whereby to wrap the wires around such one end portion of the shaft, and thereafter reciprocating the armature from one side to the other of such winding throat and rotating the armature at the end of each stroke to form wire coils each having opposite side portions disposed in at least two slots of the body and opposite end portions extending across the opposite ends of the body from one slot to another.

WILLIAM P. HUNSDORF.

REFERENCES CITED

The following references are of record in the file of this patent:

UNITED STATES PATENTS

| Number | Name | Date |
|---|---|---|
| 1,240,448 | Hensley | Sept. 18, 1917 |
| 1,351,230 | Chapman | Aug. 31, 1920 |
| 1,463,839 | Raabe | Aug. 7, 1923 |
| 1,692,114 | Darby | Nov. 20, 1928 |
| 2,125,309 | Oswald | Aug. 2, 1938 |
| 2,315,300 | Vaillant | Mar. 30, 1943 |
| 2,339,589 | Stearns | Jan. 18, 1944 |
| 2,381,750 | Hansdorf | Aug. 7, 1945 |
| 2,488,771 | Glass | Nov. 22, 1949 |

FOREIGN PATENTS

| Number | Country | Date |
|---|---|---|
| 516,694 | Germany | of 1931 |